(12) United States Patent
Takano et al.

(10) Patent No.: US 8,187,520 B2
(45) Date of Patent: May 29, 2012

(54) NONWOVEN FABRIC FOR FILTERS AND METHOD OF PRODUCING THE SAME

(75) Inventors: Nobuyuki Takano, Kusatsu (JP); Masashi Ito, Kyoto (JP); Makoto Nishimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 654 days.

(21) Appl. No.: 12/162,575

(22) PCT Filed: Jan. 30, 2007

(86) PCT No.: PCT/JP2007/051424
§ 371 (c)(1),
(2), (4) Date: Dec. 3, 2008

(87) PCT Pub. No.: WO2007/088824
PCT Pub. Date: Aug. 9, 2007

(65) Prior Publication Data
US 2009/0324895 A1    Dec. 31, 2009

(30) Foreign Application Priority Data
Feb. 1, 2006   (JP) .................................. 2006-024191

(51) Int. Cl.
- *D01D 5/08* (2006.01)
- *D01D 5/12* (2006.01)
- *D01D 5/34* (2006.01)
- *D04H 3/16* (2006.01)
- *D06M 10/00* (2006.01)
- *D06M 10/02* (2006.01)

(52) U.S. Cl. .................. 264/465; 264/103; 264/172.15; 264/210.2; 264/210.8; 264/469; 264/555

(58) Field of Classification Search .................. 264/103, 264/172.15, 210.2, 211.14, 465, 469, 555, 264/210.8
See application file for complete search history.

(56) References Cited

U.S. PATENT DOCUMENTS

| | | | |
|---|---|---|---|
| 6,485,811 B1 | 11/2002 | Horiguchi et al. | |
| 2002/0042236 A1* | 4/2002 | Nobuhara et al. | 442/327 |
| 2006/0154020 A1* | 7/2006 | Kasuya et al. | 428/105 |
| 2006/0172639 A1* | 8/2006 | Yamada et al. | 442/59 |
| 2006/0243139 A1* | 11/2006 | Kirk et al. | 96/69 |
| 2006/0292954 A1* | 12/2006 | Suzuka et al. | 442/345 |

FOREIGN PATENT DOCUMENTS

| | | |
|---|---|---|
| JP | 4326911 | 11/1992 |
| JP | 8100371 | 4/1996 |
| JP | 9273063 | 10/1997 |
| JP | 2001054709 | 2/2001 |
| JP | 2001-276529 | 10/2001 |
| JP | 2003275519 | 9/2003 |
| JP | 2004124317 | 4/2004 |
| JP | 2005007268 | 1/2005 |
| JP | 2005111337 | 4/2005 |
| WO | WO-2004087293 A1 * | 10/2004 |
| WO | WO-2004094136 A1 * | 11/2004 |
| WO | WO-2005033395 A1 * | 4/2005 |

* cited by examiner

*Primary Examiner* — Leo B Tentoni
(74) *Attorney, Agent, or Firm* — Pillsbury Winthrop Shaw Pittman LLP

(57) ABSTRACT

The present invention provides a nonwoven fabric for filters which is excellent in dust collection efficiency and exhibits low pressure drop and excellent mechanical characteristics and rigidity, and a method of producing the nonwoven fabric. A nonwoven fabric for filters of the present invention is a nonwoven fabric for filters which is a long fiber nonwoven fabric, consisting of thermoplastic continuous filaments and formed by partially thermocompression bonding the thermoplastic continuous filaments, wherein the nonwoven fabric has a QF value ($Pa^{-1}$) of 0.02 to 0.08 and stiffness of 2 to 80 mN.

12 Claims, 3 Drawing Sheets

NONWOVEN FABRIC FOR FILTERS AND METHOD OF PRODUCING THE SAME

CROSS REFERENCE TO RELATED APPLICATIONS

This application is a U.S. national phase of PCT/JP2007/051424, filed on Jan. 30, 2007, and claims the benefit of Japanese Patent Application No. 2006-024191, filed on Feb. 1, 2006, both of which are hereby incorporated by reference in their entireties. The International application published in Japanese on Aug. 9, 2007 as WO 2007/088824 A1.

TECHNICAL FIELD

The present invention relates to a nonwoven fabric for filters which is excellent in dust collection efficiency and exhibits low pressure drop and excellent mechanical characteristics and rigidity, and a method of producing the nonwoven fabric.

BACKGROUND ART

Hitherto, various nonwoven fabrics are proposed as a material for an air filter or a liquid filter for removing dust. Particularly in recent years, long fiber nonwoven fabrics of a thermo compression bonding type having excellent rigidity are suitably used as a pleat-shaped filter. When the pleat-shaped filter is used, since a filtration area can be broad, an air velocity of filtration can be reduced, and therefore there are advantages that dust collection capacity can be enhanced or mechanical pressure drop can be reduced.

However, conventional long fiber nonwoven fabrics of a thermo compression bonding type were not a nonwoven fabric having an excellent balance between dust collection efficiency and a pressure drop and enough rigidity to be processed into a pleated configuration. The reason for this is that, in the prior art, a fiber diameter of a fiber composing the nonwoven fabric is more than about 10 μm and the nonwoven fabric had a design philosophy of controlling the dust collection efficiency and the pressure drop of the nonwoven fabric by only a degree of an opening based on this fiber diameter.

For example in Patent Document 1, a composite long fiber nonwoven fabric for filters comprising deformed fibers is proposed. It is said that according to this technology, mechanical characteristics and dimensional stability of the nonwoven fabric for filters can be improved, but a fiber diameter of a fiber composing the nonwoven fabric is 2 to 15 decitexes, that is, at least about 13 μm. Further, this technology is a technology in which by deforming a cross section of the fiber, a surface area per unit weight of fibers is increased and a contact area with dust is increased, and thereby, collection efficiency is improved. When deformed fibers are employed in melt-spinning, generally, a degree of deforming of the fiber is not so high because of the flowage of a polymer during melt-extrusion. Therefore, this nonwoven fabric could not be expected to increase a surface area considerably and could not adequately collect dust having a particle diameter of several microns or less.

Furthermore, in Patent Document 2, a nonwoven fabric for filters formed by laminating a plurality of nonwoven fabrics is proposed. It is conceivable that according to this technology, a nonwoven fabric for filters having high weight per unit area can be readily produced and a nonwoven fabric for filters having excellent air permeability can also be prepared. However, the nonwoven fabric proposed in this technology is formed by laminating and unifying a nonwoven fabric having a fiber diameter of 7 to 20 μm and a nonwoven fabric having a fiber diameter of 20 to 50 μm, and therefore this nonwoven fabric could not adequately collect dust having a particle diameter of several microns or less as with the nonwoven fabric of Patent Document 1. Furthermore, after a plurality of nonwoven fabrics are produced once, processing of laminating/unifying these nonwoven fabrics is required in addition, and therefore the productivity of this method was not high.

Further, in Patent Document 3, a nonwoven fabric for filters formed by attaching a binder resin to a long fiber nonwoven fabric formed by partial heat press bonding is proposed. According to this technology, it is conceivable that a nonwoven fabric for filters having an excellent ability of the filter to be processed into a pleated configuration and hardly producing fuzz can be obtained, but processing cost becomes very high since this nonwoven fabric needs processing of providing a binder resin. Furthermore, since the binder resin fills in voids between constituent fibers, dust collection efficiency is deteriorated and pressure drop increases.

Furthermore, in Patent Document 4, a nonwoven fabric for filters formed by fusing together fibers in the surface layer of a long fiber nonwoven fabric formed by partial heat press bonding is proposed. It is said that according to this technology, a nonwoven fabric for filters having less occurrence of fuzz even with long-term filter use can be obtained, but generally, when thermofusing of constituent fibers in the surface layer is accelerated, a fusing part increases, and when a surface area of fibers is decreased, a contact area with dust is reduced and collection efficiency is deteriorated. Furthermore, in this production step, after the filter is partially thermocompression bonded with an embossing roll, fibers in the surface layer are fused together with a flat roll, but if such the fused fibers increase, problems that the surface area of fibers for collecting dust is reduced and a pressure drop is increased arise. Further, when partial thermocompression bonding is performed in first, a sheet is partially thermocompression bonded at once and therefore bonding is possible only when the thermocompression bonding is performed at elevated temperatures and at a high line pressure. In such a case, the sheet is crushed and a nonwoven fabric having a preferable configuration for a filter cannot be attained. Moreover, there is a problem that the pressure drop increases if fibers fuse together and voids between fibers become less, and therefore this nonwoven fabric for filters was not superior in the dust collection efficiency and the pressure drop.

Patent Document 1: Japanese Unexamined Patent Publication No. 2001-276529
Patent Document 2: Japanese Unexamined Patent Publication No. 2004-124317
Patent Document 3: Japanese Unexamined Patent Publication No. 2005-111337
Patent Document 4: Japanese Unexamined Patent Publication No. 2005-7268

SUMMARY OF THE INVENTION

In view of the above problems associated with the prior art, it is an object of the present invention to provide a nonwoven fabric for filters having an excellent balance between dust collection efficiency and a pressure drop and having excellent mechanical strength and rigidity, and further provide a method of producing such a nonwoven fabric for filters.

The present invention adopts the following means in order to solve the problems.

That is, (1) a nonwoven fabric for filters which is a long fiber nonwoven fabric, consisting of thermoplastic continuous filaments and formed by partially thermocompression bonding the thermoplastic continuous filaments, wherein the nonwoven fabric has a QF value ($Pa^{-1}$) of 0.02 to 0.08 and stiffness of 2 to 80 mN.

(2) the nonwoven fabric for filters according to aforementioned paragraph (1), which is a long fiber nonwoven fabric, consisting of thermoplastic continuous filaments and formed by partially thermocompression bonding the thermoplastic continuous filaments, wherein the nonwoven fabric has a QF value ($Pa^{-1}$) of 0.02 to 0.08 and stiffness of 2 to 25 mN.

(3) the nonwoven fabric for filters according to the above paragraph (1) or (2), wherein the aforementioned thermoplastic continuous filament is composed of a composite type filament in which a polyester low melting point polymer is arranged about a polyester high melting point polymer.

(4) the nonwoven fabric for filters according to the above paragraph (1) or (2), wherein the aforementioned thermoplastic continuous filament is composed of a mixed fiber type filament of the filament consisting of a polyester high melting point polymer and the filament consisting of a polyester low melting point polymer.

(5) the nonwoven fabric for filters according to any one of the above paragraphs (1) to (4), wherein a ratio of a compression bonded area is 5 to 30% and the thermoplastic continuous filament is partially thermocompression bonded.

(6) the nonwoven fabric for filters according to any one of the above paragraphs (1) to (5), wherein the aforementioned nonwoven fabric is processed into a pleated configuration.

(7) A method of producing a nonwoven fabric for filters, wherein a thermoplastic polymer is melt-extruded from a spinning nozzle, the melt-extruded polymer is toed and stretched with an air sucker to form thermoplastic continuous filaments, these filaments are charged/spread and cumulated on a moving collection plane to form a fibrous web, and the resulting fibrous web is press-bonded with a flat roll and then subjected to partial thermocompression bonding by a hot embossing roll to form a long fiber nonwoven fabric.

(8) the method of producing a nonwoven fabric for filters according to the above paragraph (7), wherein the aforementioned thermoplastic continuous filament is a composite type filament in which a polyester low melting point polymer is arranged about a polyester high melting point polymer.

(9) the method of producing a nonwoven fabric for filters according to the above paragraph (7), wherein the aforementioned thermoplastic continuous filament is the filament consisting of a polyester high melting point polymer and a mixed fiber type filament consisting of a polyester low melting point polymer.

(10) the method of producing a nonwoven fabric for filters according to any one of the above paragraphs (7) to (9), wherein the aforementioned press treating by the flat roll is bonding the aforementioned fibrous webs by heat-press with a pair of flat rolls to form a nonwoven fabric and bringing one side of the nonwoven fabric into continuous contact with one roll of the aforementioned pair of flat rolls after the heat press bonding part.

In accordance with the present invention, a nonwoven fabric for filters having an excellent balance between dust collection efficiency and a pressure drop and having excellent mechanical strength and rigidity can be provided. Further, a method of producing such a nonwoven fabric for filters can be provided.

DESCRIPTION OF THE REFERENCE NUMERALS AND SYMBOLS

Figure 1:
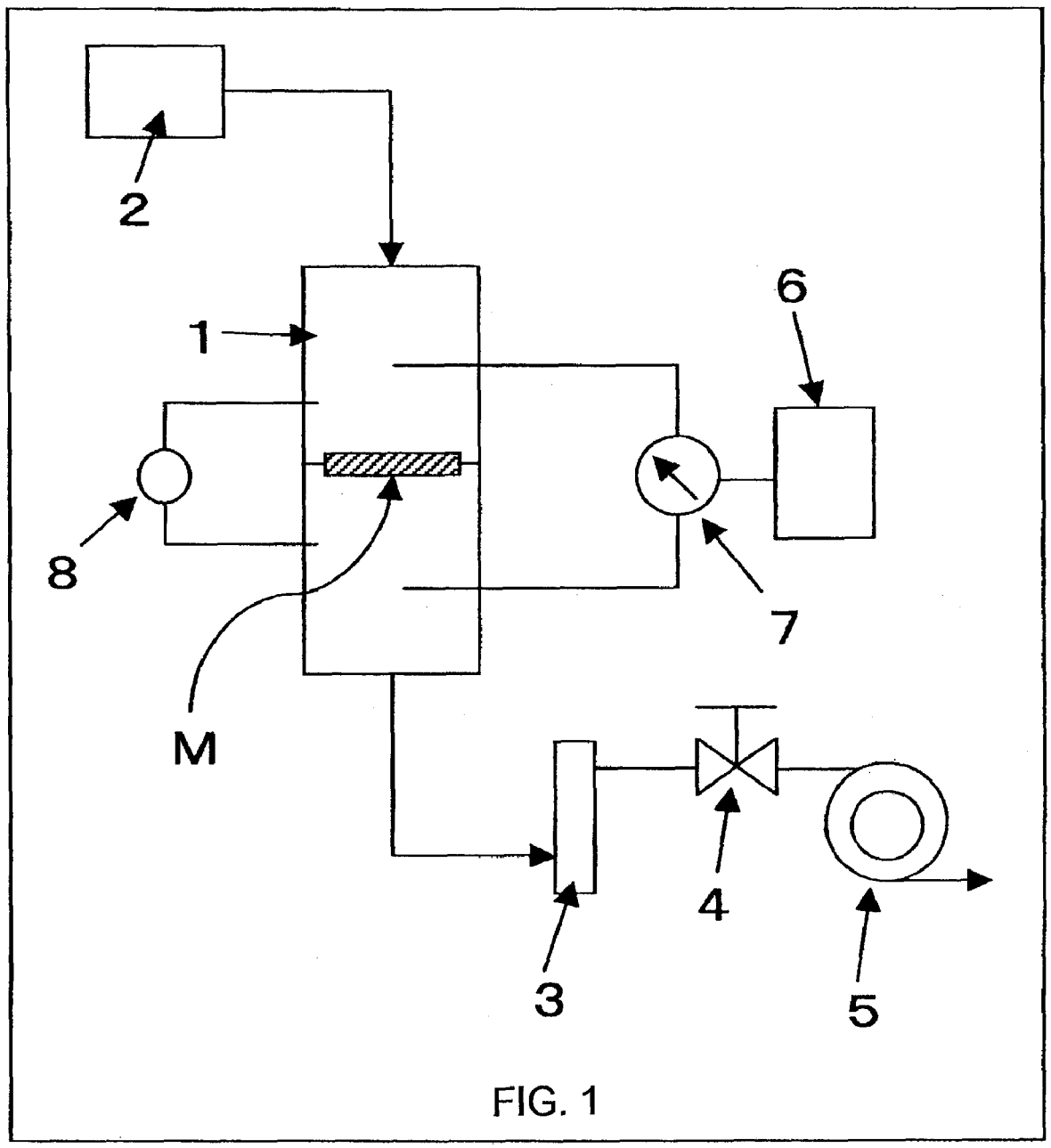
FIG. 1 is a schematic view of a collection efficiency measuring apparatus.

| | |
|---|---|
| 1 | sample holder |
| 2 | dust housing box |
| 3 | flow meter |
| 4 | flow control valve |
| 5 | blower |
| 6 | particle counter |
| 7 | switching cock |
| 8 | pressure indicator |
| M | sample to be measure |
| 9 | flat roll |
| 10 | fibrous web (nonwoven fabric) |
| 11 | heat press bonding part |
| 12 | contacting portion between a nonwoven fabric and a flat roll |

BEST MODE FOR CARRYING OUT THE INVENTION

A nonwoven fabric for filters of the present invention is a nonwoven fabric formed by partially thermocompression bonding thermoplastic continuous filaments to unify them.

Examples of raw resins of the aforementioned thermoplastic continuous filaments include polyester polymers, polyamide polymers, polyolefin polymers, and mixtures thereof. The most preferable raw resins are polyester polymers which are superior in heat resistance because of high melting point and have excellent rigidity. In addition, to the thermoplastic continuous filaments, a crystal nucleus agent, a flatting agent, a pigment, a fungicide, an anti-fungus agent, a retarder, and a hydrophilization agent may be added to the extent of not impairing an effect of the present invention.

The nonwoven fabric is composed of these thermoplastic continuous filaments, that is, the nonwoven fabric of the present invention is a long fiber nonwoven fabric, but these thermoplastic continuous filaments may be moderately cut in some locations.

Further, it is a preferable form that each of a polyester high melting point polymer and a polyester low melting point polymer is melted and spun to form mixed fiber type filaments and a long fiber nonwoven fabric is formed from the mixed fiber type filaments. Furthermore, it is the most preferable form that a long fiber nonwoven fabric is formed from composite type filament in which a polyester low melting point polymer is arranged about a polyester high melting point polymer. Here, the proportions of the polyester high melting point polymer contained and the polyester low melting point polymer contained is preferably from 30:70 to 95:5, and more preferably from 40:60 to 90:10 by weight. Furthermore, as the aforementioned polyester high melting point polymer, a polymer containing polyethylene terephthalate is preferable, and a polymer containing polyethylene terephthalate as the main component is more preferable. Here, the content of the main component is preferably 50% by weight or more, more preferably 70% by weight or more, and furthermore preferably 90% by weight or more. Further, as the aforementioned polyester low melting point polymer, a polymer containing copolymerization polyester or polybutylene terephthalate is preferable, and a polymer containing copolymerization polyester or polybutylene terephthalate as a main component is more preferable. Here, the content of the main component is preferably 50% by weight or more, more preferably 70% by weight or more, and furthermore preferably 90% by weight or more. The most preferable polymer as the polyester low melting point polymer is a polymer containing copolymerization polyester as the main component. Further, as a copolymerization component of the copolymerization polyester, isophthalic acid and adipic acid are particularly preferable.

Further, a difference in the melting points between the polyester high melting point polymer and the polyester low melting point polymer is preferably 15° C. or more, and more preferably 20° C. or more. The melting point of a polymer in the present invention is measured at a temperature raising speed of 20° C./min using a differential scanning calorimeter and a temperature taking an extremum in a melting endothermic curve obtained is considered as a melting point. Further, as for a resin, a melting endothermic curve of which does not exhibit an extremum in the differential scanning calorimeter, the resin is heated on a hot plate and a temperature at which melting of the resin is observed with a microscope is considered as a melting point.

In the present invention, as the composite type filament in which a polyester low melting point polymer is arranged about a polyester high melting point polymer, a composite type filament in which the low melting point polymer covers fully a surrounding area of the high melting point polymer, and a composite type filament in which the low melting point polymer is arranged discontinuously about the high melting point polymer are preferable forms.

In the present invention, a preferable range of a single-fiber fineness of the thermoplastic continuous filaments constituting the aforementioned nonwoven fabric is 1 to 10 decitexes. When the fineness of the thermoplastic continuous filaments is less than 1 decitex, a pressure drop of the nonwoven fabric tends to increase and thread breakage is apt to occur during production and therefore it is not preferable from the viewpoint of production stability. When the fineness of the thermoplastic continuous filaments is more than 10 decitexes, the collection performance of the nonwoven fabric tends to deteriorate and thread breakage due to defective cooling of the filaments is apt to occur during production and therefore it is not preferable from the viewpoint of production stability. More preferable range of a single-fiber fineness is 1 to 8 decitexes. In addition, the single fiber fineness referred to here is a value determined in the following manner. That is, ten small samples are extracted at random from the nonwoven fabric and photographs of magnifications of 500 to 3000 times are taken with a scanning electron microscope, and 10 fibers per each sample, 100 fibers in total, are selected at random to measure its thickness. Assuming that a cross section of the fiber is circle, its thickness is considered as a fiber diameter. A fineness is determined from a fiber diameter determined by rounding an average of these fiber diameters to the whole number and a polymer density, and a single fiber fineness is determined by rounding the obtained fineness to the whole number. Further, when two or more kinds of fibers are mixed together, a single fiber fineness of each kind of fiber may be in the above-mentioned range.

Further, a cross-sectional shape of the thermoplastic continuous filament is not particularly limited, but a circle, a hollow circle, an ellipse, a low-profile shape, deformed shapes such as an X shape and a Y shape, polygonal shapes and a multifoil shape are preferable shapes. When the cross-sectional shape such as deformed shapes, for example, an X shape or a Y shape, polygonal shapes or a multifoil shape is employed in the composite type filament in which a polyester low melting point polymer is arranged about a polyester high melting point polymer, a polyester low melting point polymer component preferably exists in the vicinity of a perimeter of the fiber cross section so that this component can contribute to thermocompression bonding for facilitating the thermocompression bonding of the nonwoven fabric.

The nonwoven fabric for filters of the present invention has a QF value ($Pa^{-1}$) in a range of 0.02 to 0.08. When the QF value ($Pa^{-1}$) is less than 0.02, it is not preferable since collection efficiency and a pressure drop are not adequate. And, it is difficult to attain the QF value ($Pa^{-1}$) more than 0.08 in the nonwoven fabric for filters in consideration of the weight per unit area of a nonwoven fabric or a method of unifying. More preferable QF value ($Pa^{-1}$) is 0.03 to 0.08. In addition, the QF value in the present invention is obtained by rounding a value calculated from the following equation to two decimal places.

$$\text{QF value } (Pa^{-1}) = -[\ln(1-(\text{collection efficiency }(\%))/100)]/(\text{pressure drop (Pa)})$$

The collection efficiency and the pressure drop in the above equation are measured by the following measuring methods or another measuring method which can give the results equal to the following methods. That is, three samples with a size of 15 cm×15 cm are extracted from random locations of the nonwoven fabric, and the collection efficiency and the pressure drop of each sample are measured with a collection efficiency measuring apparatus shown in FIG. 1. This collection efficiency measuring apparatus has a constitution in which a dust housing box 2 is connected to the upstream of a sample holder 1 to set a measuring sample M, and a flow meter 3, a flow control valve 4, and a blower 5 are connected to the downstream. Further, a particle counter 6 is connected to the sample holder 1, and number of dust particles in the upstream part of the measuring sample M and number of dust particles in the downstream part of the measuring sample M can be measured through a switching cock 7. In measuring the collection efficiency, a solution containing polystyrene particles (for example, 0.309 U 10% by weight solution of polystyrene manufactured by Nacalai Tesque, Inc.) is diluted (for example, in the case of 0.309 U manufactured by Nacalai Tesque, Inc., it is diluted with 200 parts water) with distilled water, and the solution containing polystyrene particles is filled in the dust housing box 2. Next, the sample M is set on the holder 1, and an air rate is controlled by the flow control valve 4 in such a way that an air velocity through a filter is 3.0 m/min, and a dust concentration is stabilized in a range of 20000 to $70000/(2.83 \times 10^{-4} \text{ m}^3 (0.01 \text{ ft}^3))$. Number of dust particles D2 upstream of the sample M and number of dust particles D1 downstream of the sample M are measured in a range of 0.3 to 0.5 μm with a particle counter 6 (for example, KC-01D manufactured by RION Co., Ltd.), and a value obtained by rounding a value calculated from the following equation based on the measurements to the whole number is considered as collection performance (%).

$$\text{Collection performance }(\%) = [1-(D1/D2)] \times 100$$

Here,
D1: number of dust particles in the downstream part (sum of three measurements)
D2: number of dust particles in the upstream part (sum of three measurements)

Further, the pressure drop (Pa) is determined by reading a difference in static pressures between the upstream of the sample M and the downstream of the sample M with a pressure indicator 8 when measuring the above-mentioned collection performance and rounding an average of 3 samples to the whole number.

The nonwoven fabric for filters of the present invention needs to have stiffness of 2 to 80 mN. When the stiffness is less than 2 mN, it is not preferable since the strength and the configuration retention of the nonwoven fabric tend to be low. It is not preferable particularly because the ability of the filter to be processed into a pleated configuration is deteriorated. It is difficult to make the stiffness larger than 80 mN while satisfying the above-mentioned QF value ($Pa^{-1}$) in the nonwoven fabric for filters in consideration of the weight per unit area of a nonwoven fabric or a method of unifying. The stiffness is more preferably 2 to 35 mN, further preferably 2 to 25 mN, and furthermore preferably 5 to 25 mN. Here, the stiffness in the present invention is measured with a Gurley tester (for example, Gurley Type Stiffness Tester manufactured by Toyo Seiki Seisaku-Sho Ltd.) described in JIS-L1085 (1998) 6.10.3(a). The stiffness by the Gurley tester is determined by the following method. That is, test pieces of 38.1 mm in length L (effective sample length 25.4 mm) and 25.4 mm in width d are extracted from 20 random locations of a sample. Here, in the long fiber nonwoven fabric, a longitudinal direction of the nonwoven fabric is considered as a direction of a sample length. Each extracted test piece is attached to a chuck, and the chuck is fixed in conformity with a scale, 1½ inch (1.5 inch=38.1 mm), on a movable arm A. In this case, an effective sample length required for measurement is a length obtained by subtracting ½ inch (0.5 inch=12.7 mm) from the test piece length L since ¼ inch (0.25 inch=6.35 mm) is required for the chuck and ¼ inch (0.25 inch=6.35 mm) is required for the tip of the pendulum at an open-end of the sample. Next, appropriate weights $W_a$, $W_b$ and $W_c$ (g) are attached to engaging holes a, b and c (mm) below a fulcrum of the pendulum B to rotate the movable arm A at a constant speed, and an indicated value (mgf) of a scale RG is read as the test piece leaves the pendulum B. The value of the scale RG is read to one place of decimals. Here, weights to be attached to the engaging holes can be appropriately selected but the weights are preferably set in such a way that the value of the scale RG is 4 to 6. Measurement is performed 5 times per each of a front face and a back face of 20 test pieces, 200 times in total. A value of the stiffness is determined by rounding to one decimal place a value obtained by calculating the following equation:

$$Br = RG \times (aW_a + bW_b + cW_c) \times [((L-12.7)^2)/d] \times 3.375 \times 10^{-5},$$

based on the obtained values of the scale RG. The stiffness (mN) of the specimen is determined by rounding an average of 200 measurements to the whole number.

The nonwoven fabric for filters of the present invention is a filter formed by partially thermocompression bonding, and a method of partial thermocompression bonding is not particularly limited. Bonding by a hot embossing roll or bonding by a combination of an ultrasonic oscillating unit and an embossing roll is preferable. Particularly, bonding by a hot embossing roll is the most preferable from the viewpoint of improving the strength of the nonwoven fabric. A temperature of thermobonding by the hot embossing roll is preferably lower than a melting point of a polymer having the lowest melting point in polymers existing at the fiber surface of the nonwoven fabric by 5 to 60° C., more preferably by 10 to 50° C. When a temperature difference between a in the melting points between the melting point of a polymer having the lowest melting point in polymers existing at the fiber surface of the nonwoven fabric and the temperature of thermobonding by the hot embossing roll is less than 5° C., the thermobonding tends to be too intensive and it is not preferable. When the temperature difference is larger than 60° C., it is not preferable since the thermobonding may be insufficient.

A ratio of a compression bonded area in the partial thermocompression bonding of the nonwoven fabric for filters of the present invention refers to a proportion of an area of a thermocompression bonding part in the whole area of the nonwoven fabric, and this ratio is preferably 5 to 30% in the whole area of the nonwoven fabric. When the aforementioned ratio of a compression bonded area is 5% or more, adequate strength of the nonwoven fabric is attained and the surface of the nonwoven fabric does not become fuzz-prone. When the ratio of the compression bonded area is 30% or less, it does not occur that voids between fibers become less and the pressure drop increases and collection efficiency is deteriorated. The ratio of the compression bonded area is more preferably 6 to 20%, and the most preferably 8 to 13%.

The thermocompression bonding part has depression portions, and is formed by joining thermoplastic continuous filaments composing the nonwoven fabric to one another by melting by heat and pressure. That is, a part where thermoplastic continuous filaments fuse together and coagulate as distinct from another parts is a thermocompression bonding part. When bonding by a hot embossing roll is employed as a method of thermocompression bonding, a part where thermoplastic continuous filaments fuse together and coagulate by a projection part of the embossing roll becomes a thermocompression bonding part. For example, when a pair of rolls comprising an upper roll and a lower roll, of which only one roll has projections and depressions in a predetermined pattern and the other roll is a flat roll not having has projections and depressions, is used, the thermocompression bonding part refers to a part where the thermoplastic continuous filaments of the nonwoven fabric are thermocompression bonded by the projection part of the roll having projections and depressions and the flat roll to coagulate. Further, for example, when an embossing roll comprising an upper roll and a lower roll, in which a plurality of linear grooves placed in parallel with one another are formed on the surface of the roll, wherein the groove of the upper roll and the groove of the lower roll are provided so as to cross each other at given angles, is employed, the thermocompression bonding part refers to a part where thermoplastic continuous filaments of the nonwoven fabric are thermocompression bonded by a projection part of the upper roll and a projection part of the lower roll to coagulate. In this case, a part bonded by press by the projection part of the upper roll and the depression part of the lower roll, or by the depression part of the upper roll and the projection part of the lower roll is not included in the thermocompression bonding part.

A shape of the thermocompression bonding part in the nonwoven fabric for filters of the present invention is not particularly specified. In the case where a pair of rolls comprising an upper roll and a lower roll, of which only one roll has projections and depressions in a predetermined pattern and the other roll is a flat roll not having has projections and depressions, is used, or in the case where in an embossing roll comprising an upper roll and a lower roll, in which a plurality of linear grooves placed in parallel with one another are formed on the surface of the roll, wherein the groove of the upper roll and the groove of the lower roll are provided so as to cross each other at given angles, the fibrous web is thermocompression bonded by a projection part of the upper roll and a projection part of the lower roll, a shape of the thermocompression bonding part may be a circle, a triangle, a quadrangle, a parallelogram, an ellipse, or a rhombus. An array of these thermocompression bonding parts is not particularly specified and an array of placing at equal spaces, or an array of placing at random, or an array in which different shapes are present may be used. Among others, an array, in which the thermocompression bonding parts are placed at equal spaces and regularly, is preferable from the viewpoint of the uniformity of the nonwoven fabric. Furthermore, a thermocompression bonding part of a parallelogram formed by using an embossing roll comprising an upper roll and a lower roll, in which a plurality of linear grooves placed in parallel with one another are formed on the surface of the roll, wherein the groove of the upper roll and the groove of the lower roll are provided so as to cross each other at given angles, and thermocompression bonding with the projection part of the upper roll and the projection part of the lower roll is preferable in that partial thermocompression bonding is performed without peeling off the nonwoven fabric.

The weight per unit area of the nonwoven fabric for filters of the present invention is preferably in a range of 90 to 350 g/m$^2$. When the weight per unit area is 90 g/m$^2$ or more, the rigidity is attained and the collection performance does not tend to deteriorate. If the weight per unit area is 350 g/m$^2$ or less, a possibility that the weight per unit area is too high and the pressure drop is increased is low, and further it is preferable in terms of cost. More preferable range of the weight per unit area is 100 to 320 g/m$^2$. Furthermore preferably, the weight per unit area is 150 to 260 g/m$^2$. The weight per unit area referred to here is determined by extracting three samples with a size of 50 cm in length and 50 cm in width, weighing each sample, converting an average of the obtained weight values to a weight per unit area, and rounding the converted value to the whole number.

Next, a method of producing a nonwoven fabric for filters of the present invention will be described.

The nonwoven fabric for filters of the present invention is preferably a long fiber nonwoven fabric and this long fiber nonwoven fabric is preferably produced by a spunbonding process. A preferable form of the method of producing a nonwoven fabric for filters of the present invention is a form in which a thermoplastic polymer is melt-extruded from a spinning nozzle, the melt-extruded polymer is toed and stretched with an air sucker to form thermoplastic continuous filaments, these filaments are charged/spread and cumulated on a moving collection plane to form a fibrous web, and the resulting fibrous web is press-bonded with a flat roll and then subjected to partial thermocompression bonding by a hot embossing roll to form a long fiber nonwoven fabric.

As the aforementioned thermoplastic continuous filaments, the filament consisting of a polyester high melting point polymer and the mixed fiber type filament consisting of a polyester low melting point polymer, or the composite type filament in which the polyester low melting point polymer is arranged about the polyester high melting point polymer is a preferable form, and the most preferable form is a method of adopting the composite type filament in which the polyester low melting point polymer is arranged about the polyester high melting point polymer. In the composite type filament in which the polyester low melting point polymer is arranged about the polyester high melting point polymer, when filaments are partially thermocompression bonded by a hot embossing roll, since the nonwoven fabric is unified by of the melt-deformation of the low melting point polymer component and the high melting point polymer component hardly suffer thermal damage, the unification of the nonwoven fabric is easy and it is preferable.

In the present invention, a method, in which a thermoplastic polymer is melt-extruded from a spinning nozzle and the melt-extruded polymer is toed and stretched with an air sucker to obtain thermoplastic continuous filaments, is preferable.

By charging and spreading the aforementioned thermoplastic continuous filaments and then forming fibrous web, fibers in a state of bundle become less and a surface area of fibers per unit weight become large, and therefore collection efficiency is improved as the fibrous web is formed into a nonwoven fabric. A method of charging the aforementioned thermoplastic continuous filaments is not particularly limited, but it is preferable to charge by a corona discharge method or to triboelectrically-charge based on friction of metal. In the corona discharge method, it is preferable to charge at a voltage of −10 to −50 kV.

A press bonding by the flat roll in the method of producing a nonwoven fabric for filters of the present invention is not particularly limited as long as it is a treatment of bringing the flat roll into contact with the fibrous web, but a heat treating process of bringing a heated flat roll into contact with the fibrous web is preferable. A surface temperature of the flat roll in case of heat treating with the heated flat roll is preferably lower than a melting point Tm of a resin having the lowest melting point in resins existing at the fiber surface of the fibrous web by 50 to 180° C. That is, the surface temperature of the flat roll is preferably (Tm-50)° C. to (Tm-180)° C., more preferably (Tm-60)° C. to (Tm-170)° C., and most preferably (Tm-70)° C. to (Tm-130)° C. When the heat treating temperature is lower than (Tm-180)° C., it is not preferable since a heat treatment of the fibrous web becomes insufficient and an effect of improving collection efficiency may not be sufficient. Further, when the heat treating temperature is higher than (Tm-50)° C., the heat treatment becomes too intensive and thermofusing of constituent fibers in the surface layer is accelerated, and if this causes a fusing part to increase and a surface area of fibers to decrease, a contact area with dust is reduced and collection efficiency is deteriorated. Further, when fibers fuse together and voids between fibers become less, it is not preferable since the pressure drop increases.

By press bonding with the flat roll, it is possible to prevent the fibers from fusing together excessively, and an effect of preventing the surface area of fibers from decreasing, the contact area with dust from decreasing and the collection efficiency from deteriorating is attained, and improvement in collection efficiency by heat treatment becomes adequate.

Further, a time period of bringing the flat roll into contact with the fibrous web to heat treat the fibrous web is preferably 0.1 to 200 seconds. If the time period of heat treating the nonwoven fabric is 0.1 seconds or more, an adequate effect of heat treating the nonwoven fabric is achieved and an effect of improving the collection performance becomes adequate. If the time period of heat treating the nonwoven fabric is 200 seconds or less, heat treatment does not become too intensive and the pressure drop does not become too large. A heat treatment time is more preferably 1 to 100 seconds, and furthermore preferably 2 to 50 seconds.

Figure 2:
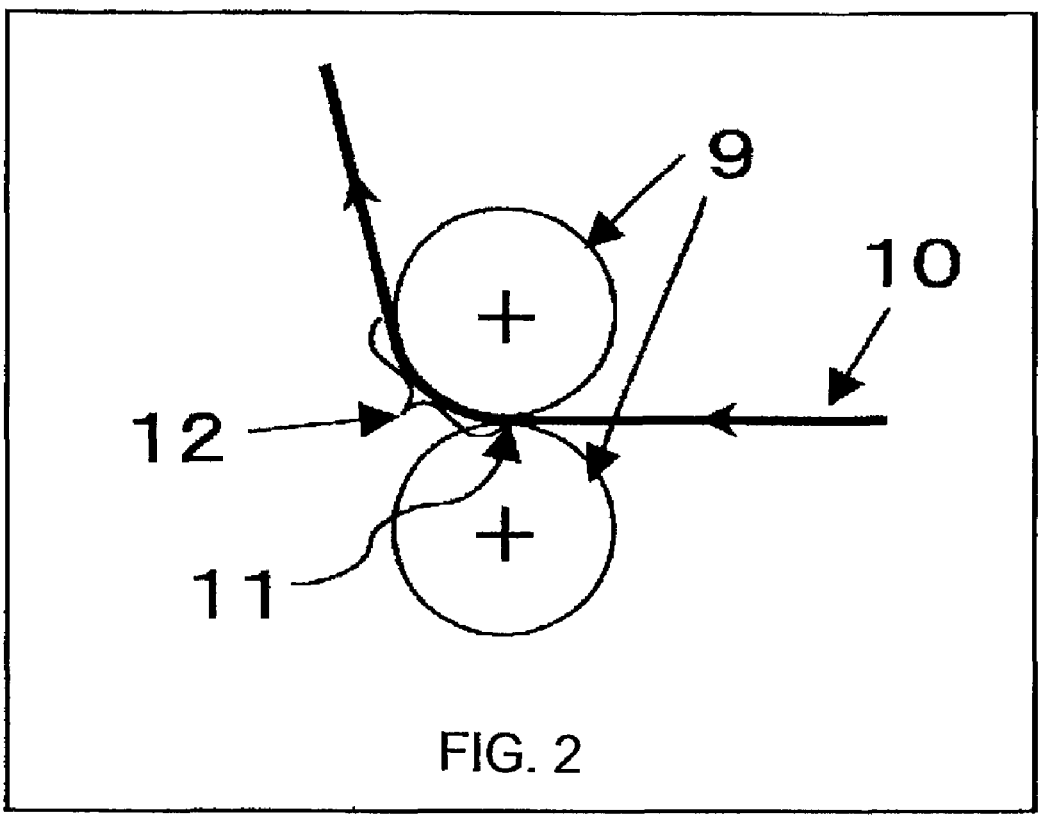
FIG. 2 is a schematic view of an example of how to heat treat a fibrous web with a pair of flat rolls.
Figure 3:
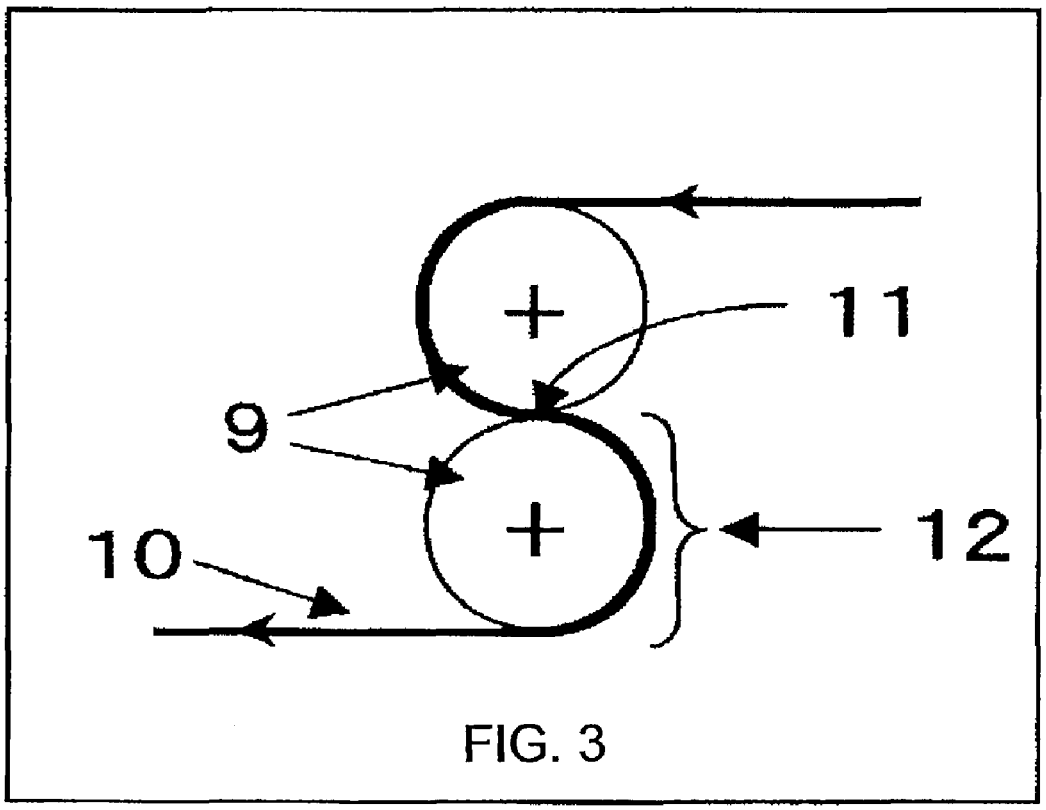
FIG. 3 is a schematic view of an example of how to heat treat a fibrous web with a pair of flat rolls.
Figure 4:
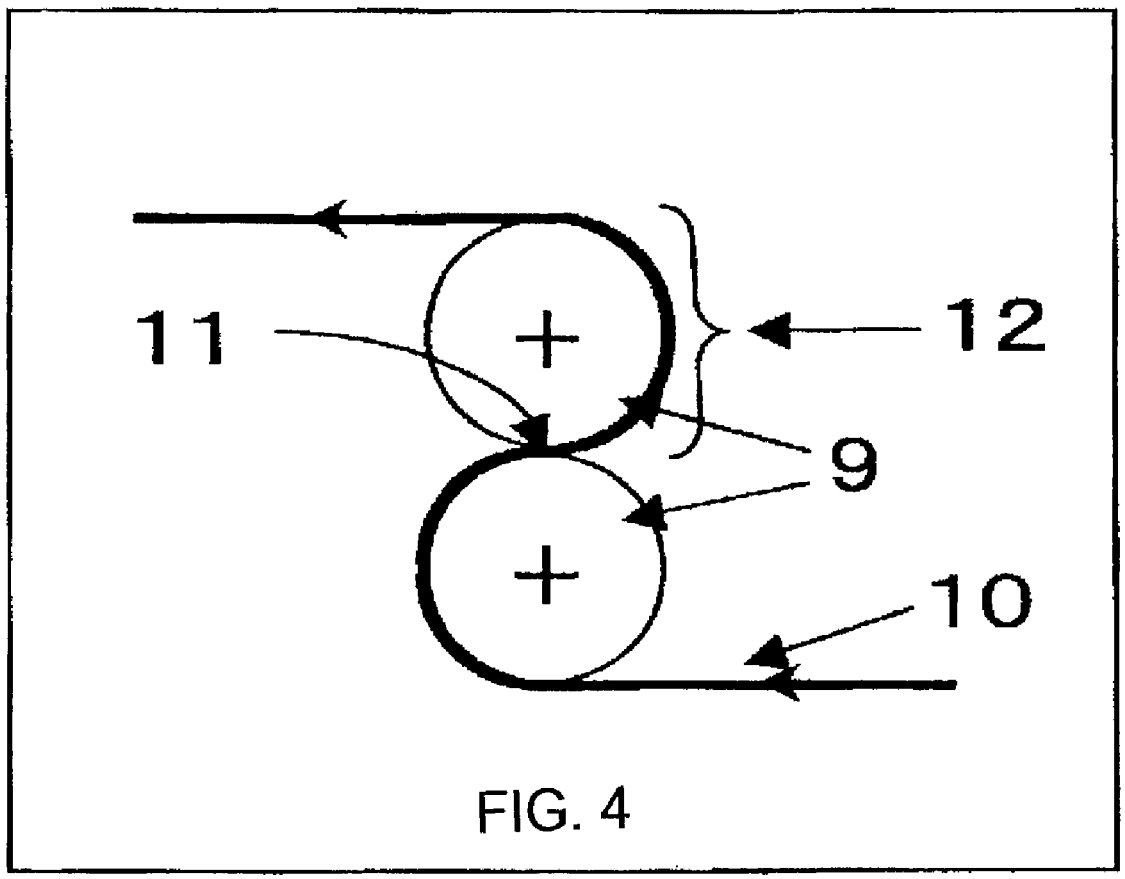
FIG. 4 is a schematic view of an example of how to heat treat a fibrous web with a pair of flat rolls.

Further, as for the aforementioned press bonding by the flat roll in the method of producing a nonwoven fabric for filters of the present invention, a method, in which a nonwoven fabric is formed by bonding the aforementioned fibrous webs by heat-press with a pair of flat rolls and the resulting nonwoven fabric is brought into continuous contact with the flat rolls after the heat press bonding part, is most preferable. That is, a method, in which a nonwoven fabric is formed by bonding fibrous webs by heat-press with a pair of flat rolls and the resulting nonwoven fabric is heat treated by bringing one side of the nonwoven fabric into continuous contact with one roll of the aforementioned pair of flat rolls after the heat press bonding part, is preferable. As a method of bringing the nonwoven fabric into contact with the roll, a method shown in FIG. 2 is common, but even a method of winding the nonwoven fabric around a pair of flat rolls in a S-shaped manner or a reverse S-shaped manner as shown in FIGS. 3, 4 may be employed as long as it is possible to bring the nonwoven fabric into continuous contact with one roll of the aforementioned pair of flat rolls after the heat press bonding part to be heat treated. A line pressure in bonding the fibrous webs by press with a pair of flat rolls is preferably in a range of 1 to 100 kg/cm, and more preferably in a range of 2 to 80 kg/cm. When the line pressure is 1 kg/cm or more, a sufficient line pressure to form a sheet can be obtained. When the line pressure is 100 kg/cm or less, bonding of the nonwoven fabric does not become too intensive and therefore the pressure drop does not become too large.

Furthermore, the aforementioned bringing the nonwoven fabric into continuous contact of with the flat rolls after the heat press bonding part is preferably performed in a state of applying a tension of 5 to 200 N/m to the nonwoven fabric in a travelling direction. When the tension is 5 N/m or more, it is preferable since the tendency of the nonwoven fabric to twist around the flat roll becomes less. When the tension is 200 N/m or less, it is preferable since the break of the nonwoven fabric hardly occurs. More preferable range of the tension is 8 to 180 N/m.

Furthermore, in the aforementioned bringing the nonwoven fabric into continuous contact of with the flat rolls after the heat press bonding part, a contact distance of the nonwoven fabric is preferably in a range of 2 to 250 cm. In the contact distance of 2 cm or more, an effect of a heat treatment becomes sufficient and adequate collection performance is attained. In the contact distance of 250 cm or less, it does not occur that the heat treatment becomes too intensive and the pressure drop becomes large. More preferable range of the contact distance is 4 to 200 cm.

Since the nonwoven fabric for filters of the present invention has excellent rigidity, it is readily processed into a pleat-shaped filter and has excellent pleated configuration retention. Accordingly, it is preferable that the nonwoven fabric for filters of the present invention is used as a pleat-shaped filter.

Applications of the nonwoven fabric for filters of the present invention is not particularly limited, but the nonwoven fabric for filters of the present invention is preferably used as an industrial filter since it has excellent mechanical strength and rigidity and is superior in dust collection efficiency. Particularly preferably, as a pleat-shaped cylindrical unit, the nonwoven fabric for filters of the present invention is used for applications such as bag filters of a dust collector or the like and liquid filters of an electric discharge machine or the like, and further is used in an air intake filter which is used for cleaning the intake air of a gas turbine or an automobile's engine. Among others, the application of the nonwoven fabric of the present invention, which has excellent strength, to a bag filter for a dust collector is preferable because in the bag filter for a dust collector, the dust is blown off the filter by back-wash air to remove the dust accumulated on the surface layer of the filter during use.

EXAMPLES

Hereinafter, the present invention will be described specifically by way of examples, but the present invention is not limited to these examples. In addition, characteristic values in Examples are measured by the following methods.

(1) Melting Point (° C.)

Measurement was performed at a temperature raising speed of 20° C./min using a differential scanning calorimeter DSC-2 manufactured by PerkinElmer Japan Co., Ltd. and a temperature taking an extremum in a melting endothermic curve obtained was considered as a melting point. Further, as for a resin, a melting endothermic curve of which does not exhibit an extremum in the differential scanning calorimeter, the resin was heated on a hot plate and a temperature at which melting of the resin was observed with a microscope was considered as a melting point.

(2) Intrinsic Viscosity IV

Intrinsic viscosity of polyester was measured by the following method.

8 g of sample was dissolved in 100 ml of o-chlorophenol, and relative viscosity $\eta_r$ was determined from the following equation:

$$\eta_r = \eta/\eta_o = (t \times d)/(t_o \times d_o),$$

using a Ostwald viscometer at 25° C.,
wherein
$\eta$: viscosity of a polymer solution,
$\eta_o$: viscosity of o-chlorophenol
t: falling time of a solution (sec),
d: density of a solution (g/cm$^3$)
$t_o$: falling time of o-chlorophenol (sec), and
$d_o$ density of o-chlorophenol (g/cm$^3$).

Next, the following equation was calculated from the relative viscosity $\eta_r$ to determine the intrinsic viscosity IV.

$$IV = 0.0242\eta_r + 0.2634$$

(3) Fineness (Decitex)

Ten small samples are extracted at random from the nonwoven fabric and photographs of magnifications of 500 to 3000 times are taken with a scanning electron microscope, and 10 fibers per each sample, 100 fibers in total, are selected at random to measure its thickness. Assuming that a cross section of the fiber is circle, its thickness is considered as a fiber diameter. A fineness is determined from a fiber diameter determined by rounding an average of these fiber diameters to the whole number and a polymer density, and a fineness is determined by rounding the obtained fineness to the whole number.

(4) Weight per Unit Area (g/m$^2$)

Three samples with a size of 50 cm in length and 50 cm in width were extracted and each sample was weighed, and an average of the obtained weight values was converted to a weight per unit area and the converted value was rounded to the whole number.

(5) Tensile Strength (N/5 cm)

A tensile test was performed on three samples with a size of 5 cm×30 cm in a vertical direction and three samples with a size of 5 cm×30 cm in a lateral direction under the conditions of a chuck distance of 20 cm and a tensile speed of 10 cm/min using a tension tester of constant stretching type, and ultimate strength in stretching the sample to break was considered as tensile strength. Each average of samples in a vertical direction and samples in a lateral direction was rounded to the whole number to determine tensile strength.

(6) Collection Efficiency (%), Pressure Drop (Pa), QF Value (Pa$^{-1}$)

Dust collection efficiency was measured by the following method.

Three samples with a size of 15 cm×15 cm were extracted from random locations of the nonwoven fabric, and the collection efficiency of each sample is measured with a collection efficiency measuring apparatus shown in FIG. 1. This collection efficiency measuring apparatus has a constitution in which a dust housing box 2 is connected to the upstream of a sample holder 1 to set a measuring sample M, and a flow meter 3, a flow control valve 4, and a blower 5 are connected to the downstream. Further, a particle counter 6 is connected to the sample holder 1, and number of dust particles in the upstream part of the measuring sample M and number of dust particles in the downstream part of the measuring sample M can be measured through a switching cock 7. In measuring the collection efficiency, a 10% by weight solution of polystyrene 0.309 U (produced by Nacalai Tesque, Inc.) is diluted with 200 parts distilled water, and the diluted solution was filled in the dust housing box 2. Next, the sample M is set on the holder 1, and an air rate is controlled by the flow control valve 4 in such a way that an air velocity through a filter is 3.0 m/min, and a dust concentration is stabilized in a range of 20000 to 70000/(2.83×10$^{-4}$ m$^3$(0.01 ft$^3$)). Number of dust particles D2 in the upstream part of the sample M and number of dust particles D1 in the downstream part of the sample M were measured in a range of 0.3 to 0.5 μm with a particle counter 6 (for example, KC-01D manufactured by RION Co., Ltd.), and a value calculated from the following equation is rounded to the whole number to obtain collection efficiency (%).

Collection efficiency (%)=[1−(D1/D2)]×100

Here,

D1: number of dust particles in the downstream part (sum of three measurements)

D2: number of dust particles in the upstream part (sum of three measurements)

Further, the pressure drop (Pa) is determined by reading a difference in static pressures between the upstream of the sample M and the downstream of the sample M with a pressure indicator 8 when measuring the above-mentioned collection performance and rounding an average of 3 samples to the whole number.

In addition, the QF value is obtained by rounding to two decimal places a value calculated from the following equation:

QF value (Pa$^{-1}$)=−[ln(1−(collection efficiency (%))/100)]/(pressure drop (Pa)), using the collection efficiency and the pressure drop value, determined by the above methods.

(7) Stiffness (mN)

The stiffness was measured with a Gurley tester (Gurley Type Stiffness Tester manufactured by Toyo Seiki Seisaku-Sho Ltd.) described in JIS-L1085 (1998) 6.10.3(a). The stiffness by the Gurley tester was determined by the following method. That is, test pieces of 38.1 mm in length L (effective sample length 25.4 mm) and 25.4 mm in width d are extracted from 20 random locations of a sample. Here, in the long fiber nonwoven fabric, a longitudinal direction of the nonwoven fabric is considered as a direction of a sample length. Each extracted test piece is attached to a chuck, and the chuck is fixed in conformity with a scale, 1½ inch (1.5 inch=38.1 mm), on a movable arm A. In this case, an effective sample length required for measurement is a length obtained by subtracting ½ inch (0.5 inch=12.7 mm) from the test piece length L since ¼ inch (0.25 inch=6.35 mm) is required for the chuck and ¼ inch (0.25 inch=6.35 mm) is required for the tip of the pendulum at an open-end of the sample. Next, appropriate weights $W_a$, $W_b$ and $W_c$ (g) are attached to engaging holes a, b and c (mm) below a fulcrum of the pendulum B to rotate the movable arm A at a constant speed, and an indicated value (mgf) of a scale RG is read as the test piece leaves the pendulum B. The value of the scale RG is read to one place of decimals. Here, weights attached to the engaging holes were set in such a way that the value of the scale RG is 4 to 6. Measurement is performed 5 times per each of a front face and a back face of 20 test pieces, 200 times in total. A value of the stiffness is determined by rounding to one decimal place a value obtained by calculating the following equation:

Br=RG×($aW_a$+$bW_b$+$cW_c$)×[((L−12.7)$^2$)/d]×3.375×10$^{-5}$, based on the obtained values of the scale RG. The stiffness (mN) of the specimen is determined by rounding an average of 200 measurements to the whole number.

Example 1

Polyethylene terephthalate (PET) having intrinsic viscosity IV of 0.65 and a melting point of 260° C., which was dried to a water content of 50 ppm or less by weight, and copolymerization polyester (CO-PET) having intrinsic viscosity IV of 0.66 and a melting point of 230° C., which was dried to a water content of 50 ppm or less by weight, in which a copolymerization ratio of isophthalic acid was 11 mole %, were melted at 295° C. and 280° C., respectively. These polyethylene terephthalate and copolymerization polyester were extruded from a pore as a core component and a sheath component, respectively, at a nozzle temperature of 300° C. in proportions of the core and the sheath of 80:20 by weight, and these components were spun into filaments having a circular cross section at a spinning speed of 4300 m/min with an air sucker, and fibers were charged at a voltage of −30 kV by a corona discharge method to spread the fibers, and the spread fibers were collected as a fibrous web on a moving net conveyor. The collected fibrous webs were bonded by heat-press at 80° C. and at a line pressure of 10 kg/cm by a flat roll on the net conveyor, and subsequently a sheet of the fibrous web was brought into continuous contact with the flat roll a distance of 4 cm and then thermocompression bonded at 180° C. and at a line pressure of 70 kg/cm by an embossing roll comprising an upper roll and a lower roll, in which a plurality of linear grooves placed in parallel with one another are formed on the surface of the roll, wherein the groove of the upper roll and the groove of the lower roll are provided so as to cross each other at given angles and these grooves are arranged in such a way that the fibrous web is thermocompression bonded by a projection part of the upper roll and a projection part of the lower roll and the ratio of the compression bonded area is 10% to obtain a spunbonded nonwoven fabric having a fineness of 2 decitexes and weight per unit area of 260 g/m$^2$.

Example 2

Polyethylene terephthalate (PET) having intrinsic viscosity IV of 0.65 and a melting point of 260° C., which was dried to a water content of 50 ppm or less by weight, and copolymerization polyester (CO-PET) having intrinsic viscosity IV of 0.66 and a melting point of 230° C., which was dried to a water content of 50 ppm or less by weight, in which a copolymerization ratio of isophthalic acid was 11 mole %, were melted at 295° C. and 280° C., respectively. These polyethylene terephthalate and copolymerization polyester were extruded through a spinning nozzle for mixing fibers in which discharge pores are arranged so as to discharge polyethylene terephthalate and copolymerization polyester separately through different discharge pores (number of nozzle pores is set in such a way that proportions of polyethylene terephthalate and copolymerization polyester is 8:2) at a nozzle temperature of 295° C., and then these components were spun into filaments having a circular cross section at a spinning speed of 4500 m/min with an air sucker, and fibers were charged at a voltage of −30 kV by a corona discharge method to spread the fibers, and the spread fibers were collected as a fibrous web on a moving net conveyor. The collected fibrous webs were bonded by heat-press at 130° C. and at a line pressure of 60 kg/cm by a pair of flat rolls, and subsequently a sheet of the fibrous web was brought into continuous contact with the flat roll a distance of 120 cm and then thermocompression bonded at 190° C. and at a line pressure of 80 kg/cm by an embossing roll comprising an upper roll and a lower roll, in which a plurality of linear grooves placed in parallel with one another are formed on the surface of the roll, wherein the groove of the upper roll and the groove of the lower roll are provided so as to cross each other at given angles and these grooves are arranged in such a way that the fibrous web is thermocompression bonded by a projection part of the upper roll and a projection part of the lower roll and the ratio of the compression bonded area is 10% to obtain a spunbonded nonwoven fabric having a fineness of 3 decitexes and weight per unit area of 260 g/m$^2$.

Example 3

A spunbonded nonwoven fabric was prepared by following the same procedure as in Example 1 except for changing weight per unit area to 200 g/m$^2$.

Example 4

Polyethylene terephthalate (PET) having intrinsic viscosity IV of 0.65 and a melting point of 260° C., which was dried to a water content of 50 ppm or less by weight, and copolymerization polyester (CO-PET) having intrinsic viscosity IV of 0.66 and a melting point of 230° C., which was dried to a water content of 50 ppm or less by weight, in which a copolymerization ratio of isophthalic acid was 11 mole %, were melted at 295° C. and 280° C., respectively. These polyethylene terephthalate and copolymerization polyester were extruded from a pore as a core component and a sheath component, respectively, at a nozzle temperature of 300° C. in proportions of the core and the sheath of 80:20 by weight, and these components were spun into filaments having a circular cross section at a spinning speed of 4300 m/min with an air sucker, and the filaments impinge against a metal impingement plate installed at an air sucker outlet to generate triboelectric charge, and the fibers were charged by the triboelectric charge and spread, and the spread fibers were collected as a fibrous web on a moving net conveyor. The collected fibrous webs were bonded by heat-press at 120° C. and at a line pressure of 50 kg/cm by a flat roll on the net conveyor, and subsequently a sheet of the fibrous web was brought into continuous contact with the flat roll a distance of 120 cm and then thermocompression bonded at 200° C. and at a line pressure of 70 kg/cm by an embossing roll comprising an upper roll and a lower roll, in which a plurality of linear grooves placed in parallel with one another are formed on the surface of the roll, wherein the groove of the upper roll and the groove of the lower roll are provided so as to cross each other at given angles, and these grooves are arranged in such a way that the fibrous web is thermocompression bonded by a projection part of the upper roll and a projection part of the lower roll and the ratio of the compression bonded area is 10% to obtain a spunbonded nonwoven fabric having a fineness of 3 decitexes and weight per unit area of 260 g/m$^2$.

TABLE 1

Table 1

| | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Fineness (decitex) | | 2 | 3 | 3 | 3 | 2 | 2 | 3 | 2 | 2 |
| Weight per unit area (g/m$^2$) | | 260 | 260 | 200 | 260 | 260 | 260 | 200 | 260 | 260 |
| Ratio of compression bonded area (%) | | 10 | 10 | 10 | 10 | 16 | 18 | 3 | 50 | 16 |
| Tensile strength (N/5 cm) | Longitudinal | 882 | 1063 | 912 | 990 | 905 | 1125 | 485 | 1200 | 950 |
| | Lateral | 538 | 718 | 562 | 617 | 241 | 695 | 349 | 780 | 620 |
| Collection efficiency (%) | | 59 | 79 | 72 | 79 | 57 | 43 | 21 | 45 | 48 |
| Pressure drop (Pa) | | 30 | 36 | 27 | 36 | 87 | 57 | 27 | 120 | 130 |
| QF value (Pa$^{-1}$) | | 0.03 | 0.04 | 0.05 | 0.04 | 0.01 | 0.01 | 0.01 | 0.01 | 0.01 |
| Stiffness (mN) | | 25 | 24 | 22 | 32 | 15 | 18 | 1 | 4 | 4 |

Characteristics of the obtained nonwoven fabric are as shown in Table 1, and all nonwoven fabrics of Examples 1 to 4 have excellent tensile strength and stiffness. Since these nonwoven fabrics are also superior in collection efficiency and a pressure drop, their QF values ($Pa^{-1}$) are 0.03, 0.04, 0.05 and 0.04 and excellent.

Comparative Example 1

Polyethylene terephthalate (PET) having intrinsic viscosity IV of 0.65 and a melting point of 260° C., which was dried to a water content of 50 ppm or less by weight, was melted at 295° C., and extruded from a pore at a nozzle temperature of 300° C., and the extruded PET was spun into filaments having a circular cross section at a spinning speed of 4400 m/min with an air sucker, and fibers were charged at a voltage of −30 kV by a corona discharge method to spread the fibers, and the spread fibers were collected as a fibrous web on a moving net conveyor. The collected fibrous webs were thermocompression bonded at 240° C. and at a line pressure of 60 kg/cm by an embossing roll in which a roll having circular projection parts was as an upper roll and a flat roll not having projections and depressions was used as a lower roll, and circular projection parts are arranged in such a way that the ratio of the compression bonded area is 16% to obtain a spunbonded nonwoven fabric having a fineness of 2 decitexes and weight per unit area of 260 g/m².

Comparative Example 2

Polyethylene terephthalate (PET) having intrinsic viscosity IV of 0.65 and a melting point of 260° C., which was dried to a water content of 50 ppm or less by weight, and copolymerization polyester (CO-PET) having intrinsic viscosity IV of 0.66 and a melting point of 230° C., which was dried to a water content of 50 ppm or less by weight, in which a copolymerization ratio of isophthalic acid was 11 mole %, were melted at 295° C. and 280° C., respectively. These polyethylene terephthalate and copolymerization polyester were extruded from a pore as a core component and a sheath component, respectively, at a nozzle temperature of 300° C. in proportions of the core and the sheath of 80:20 by weight, and these components were spun into filaments having a circular cross section at a spinning speed of 4300 m/min with an air sucker, and fibers were collected as a fibrous web on a moving net conveyor without being charged. The collected fibrous webs were thermocompression bonded at 200° C. and at a line pressure of 70 kg/cm by an embossing roll in which a roll having circular projection parts was as an upper roll and a flat roll not having projections and depressions was used as a lower roll, and circular projection parts are arranged in such a way that the ratio of the compression bonded area is 18% to obtain a spunbonded nonwoven fabric having a fineness of 2 decitexes and weight per unit area of 260 g/m².

Comparative Example 3

Polyethylene terephthalate (PET) having intrinsic viscosity IV of 0.65 and a melting point of 260° C., which was dried to a water content of 50 ppm or less by weight, was melted at 295° C., and extruded from a pore at a nozzle temperature of 300° C., and the extruded PET was spun into filaments having a circular cross section at a spinning speed of 4400 m/min with an air sucker, and fibers were collected as a fibrous web on a moving net conveyor without being charged. The collected fibrous webs were thermocompression bonded at 180° C. and at a line pressure of 30 kg/cm by an embossing roll in which a roll having circular projection parts was as an upper roll and a flat roll not having projections and depressions was used as a lower roll, and circular projection parts are arranged in such a way that the ratio of the compression bonded area is 3% to obtain a spunbonded nonwoven fabric having a fineness of 3 decitexes and weight per unit area of 200 g/m².

Comparative Example 4

Polyethylene terephthalate (PET) having intrinsic viscosity IV of 0.65 and a melting point of 260° C., which was dried to a water content of 50 ppm or less by weight, and copolymerization polyester (CO-PET) having intrinsic viscosity IV of 0.66 and a melting point of 230° C., which was dried to a water content of 50 ppm or less by weight, in which a copolymerization ratio of isophthalic acid was 11 mole %, were melted at 295° C. and 280° C., respectively. These polyethylene terephthalate and copolymerization polyester were extruded from a pore as a core component and a sheath component, respectively, at a nozzle temperature of 300° C. in proportions of the core and the sheath of 20:80 by weight, and these components were spun into filaments having a circular cross section at a spinning speed of 4300 m/min with an air sucker, and the filaments were collected as a fibrous web on a moving net conveyor. The collected fibrous webs were thermocompression bonded at 200° C. and at a line pressure of 70 kg/cm by an embossing roll in which a roll having circular projection parts was as an upper roll and a flat roll not having projections and depressions was used as a lower roll, and circular projection parts are arranged in such a way that the ratio of the compression bonded area is 50% to obtain a spunbonded nonwoven fabric having a fineness of 2 decitexes and weight per unit area of 260 g/m².

Comparative Example 5

Polyethylene terephthalate (PET) having intrinsic viscosity IV of 0.65 and a melting point of 260° C., which was dried to a water content of 50 ppm or less by weight, and copolymerization polyester (CO-PET) having intrinsic viscosity IV of 0.66 and a melting point of 230° C., which was dried to a water content of 50 ppm or less by weight, in which a copolymerization ratio of isophthalic acid was 11 mole %, were melted at 295° C. and 280° C., respectively. These polyethylene terephthalate and copolymerization polyester were extruded from a pore as a core component and a sheath component, respectively, at a nozzle temperature of 300° C. in proportions of the core and the sheath of 80:20 by weight, and these components were spun into filaments having a circular cross section at a spinning speed of 4400 m/min with an air sucker, and fibers were charged at a voltage of −30 kV by a corona discharge method to spread the fibers, and the spread fibers were collected as a fibrous web on a moving net conveyor. The collected fibrous webs were thermocompression bonded at 240° C. and at a line pressure of 60 kg/cm by an embossing roll in which a roll having circular projection parts was as an upper roll and a flat roll not having projections and depressions was used as a lower roll, and circular projection parts are arranged in such a way that the ratio of the compression bonded area is 16%, and then bonded by heat-press at 205° C. and at a line pressure of 50 kg/cm by a pair of flat rolls, and subsequently a sheet of the fibrous web was brought into continuous contact with the flat roll a distance of 120 cm to obtain a spunbonded nonwoven fabric having a fineness of 2 decitexes and weight per unit area of 260 g/m².

Characteristics of the obtained nonwoven fabric are as shown in Table 1, and all nonwoven fabrics of Comparative Examples 1, 2, 4 and 5 have excellent tensile strength and stiffness. However, the QF values ($Pa^{-1}$) derived from the collection efficiency and the pressure drop are all 0.01, and performance as a filter was poor. Further, the nonwoven fabric of Comparative Example 3 had insufficient thermobonding, weak tensile strength and low stiffness. Furthermore, the QF value ($Pa^{-1}$) was as low as 0.01, and performance as a filter was poor. Further, since in Comparative Example 5, the fibrous web was thermocompression bonded with the embossing roll and then bonded by heat-press with the flat roll and the nonwoven fabric was prepared in the reverse order from that in the production method of the present invention, the stiffness and the QF value ($Pa^{-1}$) were low.

INDUSTRIAL APPLICABILITY

Since the nonwoven fabric for filters of the present invention is excellent in dust collection efficiency and exhibits low pressure drop and excellent mechanical characteristics and rigidity, it can be suitably used particularly as industrial air filters or liquid filters.

The invention claimed is:

1. A method of producing a nonwoven fabric for filters, comprising:
    melt-extruding a thermoplastic polymer from a spinning nozzle, wherein the melt-extruded thermoplastic polymer is toed and stretched with an air sucker to form thermoplastic continuous filaments, wherein the thermoplastic continuous filaments are charged/spread and cumulated on a moving collection plane to form a fibrous web, and
    press-treating the fibrous web with a flat roll and then subjecting the press-treated fibrous web to partial thermocompression bonding by a hot embossing roll to form a long fiber nonwoven fabric.

2. The method of producing a nonwoven fabric for filters according to claim 1, wherein said thermoplastic continuous filaments comprise a composite type filament in which a polyester low melting point polymer is arranged about a polyester high melting point polymer.

3. The method of producing a nonwoven fabric for filters according to claim 1, wherein said thermoplastic continuous filaments comprise a filament consisting of a polyester high melting point polymer and a mixed fiber type filament consisting of a polyester low melting point polymer.

4. The method of producing a nonwoven fabric for filters according to claim 1, wherein said press treating by the flat roll is bonding said fibrous webs by heat-press with a pair of flat rolls to form a nonwoven fabric and bringing one side of the nonwoven fabric into continuous contact with one roll of said pair of flat rolls after the heat press bonding part.

5. The method of producing a nonwoven fabric for filters according to claim 1, wherein the nonwoven fabric has a QF value ($Pa^{-1}$) of 0.02 to 0.08.

6. The method of producing a nonwoven fabric for filters according to claim 1, wherein the nonwoven fabric has a stiffness of 2 to 80 mN.

7. The method of producing a nonwoven fabric for filters according to claim 1, wherein the nonwoven fabric has a QF value ($Pa^{-1}$) of 0.02 to 0.08 and stiffness of 2 to 80 mN.

8. The method of producing a nonwoven fabric for filters according to claim 1, wherein the nonwoven fabric has a QF value ($Pa^{-1}$) of 0.02 to 0.08 and stiffness of 2 to 25 mN.

9. The method of producing a nonwoven fabric for filters according to claim 1, wherein said thermoplastic continuous filaments comprise a composite type filament comprising a polyester low melting point polymer and a polyester high melting point polymer.

10. The method of producing a nonwoven fabric for filters according to claim 1, wherein said thermoplastic continuous filaments comprise a mixed fiber type filament comprising a polyester high melting point polymer filament and a polyester low melting point polymer filament.

11. The method of producing a nonwoven fabric for filters according to claim 1, wherein compression bonded area is 5 to 30% of a total area of the nonwoven fabric and the thermoplastic continuous filaments are partially thermocompression bonded.

12. The method of producing a nonwoven fabric for filters according to claim 1, wherein said nonwoven fabric has a pleated configuration.

* * * * *